(12) United States Patent
Lee et al.

(10) Patent No.: US 10,671,538 B2
(45) Date of Patent: Jun. 2, 2020

(54) MEMORY SYSTEM FOR SUPPORTING A MERGE OPERATION AND METHOD FOR OPERATING THE SAME

(71) Applicant: SK hynix Inc., Gyeonggi-do (KR)

(72) Inventors: Jong-Min Lee, Seoul (KR); Beom-Rae Jeong, Gyeonggi-do (KR)

(73) Assignee: Sk hynix Inc., Gyeonggi-do (KR)

( * ) Notice: Subject to any disclaimer, the term of this patent is extended or adjusted under 35 U.S.C. 154(b) by 0 days.

(21) Appl. No.: 16/123,467

(22) Filed: Sep. 6, 2018

(65) Prior Publication Data

US 2019/0258577 A1 Aug. 22, 2019

(30) Foreign Application Priority Data

Feb. 19, 2018 (KR) .................. 10-2018-0019211

(51) Int. Cl.
*G06F 12/0868* (2016.01)
*G06F 12/0831* (2016.01)
*G06F 3/06* (2006.01)
*G06F 12/02* (2006.01)

(52) U.S. Cl.
CPC ......... *G06F 12/0868* (2013.01); *G06F 3/061* (2013.01); *G06F 3/064* (2013.01); *G06F 3/0634* (2013.01); *G06F 3/0679* (2013.01); *G06F 12/0833* (2013.01); *G06F 12/0246* (2013.01)

(58) Field of Classification Search
CPC ............. G06F 12/0246; G06F 12/0833; G06F 12/0868; G06F 3/061; G06F 3/0634; G06F 3/064; G06F 3/0679; G06F 3/0659; G06F 3/0688; G06F 2212/1016; G06F 2212/312; G06F 2212/7203; G06F 2212/7204

See application file for complete search history.

(56) References Cited

U.S. PATENT DOCUMENTS

| | | | |
|---|---|---|---|
| 5,715,447 A | 2/1998 | Hayashi et al. | |
| 7,404,043 B2* | 7/2008 | Edirisooriya | G06F 12/126 711/133 |
| 2003/0204679 A1* | 10/2003 | Blankenship | G06F 12/0835 711/146 |
| 2014/0181375 A1 | 6/2014 | Miyamoto et al. | |

* cited by examiner

*Primary Examiner* — Aracelis Ruiz
(74) *Attorney, Agent, or Firm* — IP & T Group LLP

(57) ABSTRACT

A memory system may include: a nonvolatile memory device comprising a plurality of memory blocks each of which includes a plurality of pages; a volatile memory device configured to temporarily store data to be transmitted between a host and the nonvolatile memory device; and a controller configured to enter an exclusive mode in response to a request of the host, a result of checking a state of the nonvolatile memory device, or performing a merge operation on the nonvolatile memory device, exclusively use the volatile memory device to perform the merge operation during an entry period of the exclusive mode, and exit the exclusive mode in response to completing the performing of the merge operation.

20 Claims, 11 Drawing Sheets

MEMORY SYSTEM FOR SUPPORTING A MERGE OPERATION AND METHOD FOR OPERATING THE SAME

CROSS-REFERENCE TO RELATED APPLICATION

This application claims priority under 35 U.S.C. § 119(a) to Korean Patent Application No. 10-2018-0019211 filed on Feb. 19, 2018, which is incorporated herein by reference in its entirety.

BACKGROUND

1. Field

Exemplary embodiments relate to a memory system, and more particularly, to a memory system for supporting a merge operation, and a method for operating the memory system.

2. Discussion of the Related Art

The computer environment paradigm has shifted into ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems may provide excellent stability, durability, high information access speed, and low power consumption because they have no moving parts (e.g., a mechanical arm with a read/write head) as compared with a hard disk device. Examples of memory systems having such advantages include universal serial bus (USB) memory devices, memory cards having various interfaces, and solid-state drives (SSD).

SUMMARY

Various embodiments are directed to a memory system capable of improving, enhancing or maximizing performance in performing a merge operation, and a method of operating the memory system.

In an embodiment, a memory system may include: a nonvolatile memory device comprising a plurality of memory blocks each of which includes a plurality of pages; a volatile memory device configured to temporarily store data to be transmitted between a host and the nonvolatile memory device; and a controller configured to enter an exclusive mode in response to at least one of a request of the host, a result of checking a state of the nonvolatile memory device and a merge operation performed on the nonvolatile memory device, to exclusively use the volatile memory device to perform the merge operation during an entry period of the exclusive mode, and to exit the exclusive mode in response to completing the merge operation.

The controller may include: a host controller configured to process an operation between the controller and the host; a memory controller coupled with the host controller, and configured to process an operation between the controller and the nonvolatile memory device, and the memory controller may transmit an exclusive mode exit request to the host controller in response to completing the performing of the merge operation.

The host controller may enter the exclusive mode in response to an exclusive mode entry request transmitted from the memory controller, and may notify the host of conversion into a busy state in response to entering the exclusive mode, and the host controller may exit the exclusive mode in response to the exclusive mode exit request transmitted from the memory controller, and may notify the host of conversion into a ready state in response to exiting the exclusive mode.

The memory controller may check a proportion of free memory blocks among the memory blocks, and may transmit the exclusive mode entry request to the host controller when the proportion of the free memory blocks is equal to or less than a predetermined value as a result of the checking.

The memory controller may check, when the merge operation is performed, a total number of valid pages included in victim memory blocks among the memory blocks, and may transmit the exclusive mode entry request to the host controller when the total number of valid pages is equal to or greater than a predetermined value as a result of the checking.

The memory controller may transmit the exclusive mode entry request to the host controller each time the merge operation is performed.

The host controller may enter the exclusive mode in response to receiving a request for the performing of the merge operation from the host, may request the performance of the merge operation to the memory controller, and may notify the host of conversion into the busy state in response to entering the exclusive mode, and the host controller may exit the exclusive mode in response to the exclusive mode exit request transmitted from the memory controller, and notifies the host of conversion into the ready state in response to exiting the exclusive mode.

The memory controller may flush data stored in the volatile memory device to the nonvolatile memory device in response to entering the exclusive mode through the host controller, and then may exclusively use the volatile memory device for the performing of the merge operation on the nonvolatile memory device during the entry period of the exclusive mode.

The memory controller may convert a state of data updated to the nonvolatile memory device among data stored in the volatile memory device into a discard state in response to entering the exclusive mode through the host controller, and may exclusively use the volatile memory device for the performing of the merge operation on the nonvolatile memory device during the entry period of the exclusive mode.

The merge operation may include an operation of merging valid data included in at least two victim memory blocks among the memory blocks, and transferring the merged valid data to a target memory block.

In an embodiment, a method for operating a memory system comprising a nonvolatile memory device including a plurality of memory blocks each of which includes a plurality of pages, and a volatile memory device configured to temporarily store data to be transmitted between a host and the nonvolatile memory device, the method may include: entering an exclusive mode in response to at least one of a request of the host, a result of checking a state of the nonvolatile memory device and a merge operation performed on the nonvolatile memory device; exclusively using the volatile memory device to perform the merge operation during an entry period of the exclusive mode; and exiting the exclusive mode in response to completing the performing of the merge operation.

The memory system may further include a host controller configured to process an operation between the memory system and the host, and a memory controller coupled with the host controller and configured to process an operation between the memory system and the nonvolatile memory device, and the exiting may include generating, by the memory controller, an exclusive mode exit request after the performing of the merge operation is competed, and transmitting the exclusive mode exit request to the host controller.

The entering may include: a first entering operation of entering, by the host controller, the exclusive mode in response to an exclusive mode entry request transmitted from the memory controller to the host controller; a second entering operation of entering, by the host controller, the exclusive mode in response to a request for the performing of the merge operation, the request being transmitted from the host to the host controller, and requesting the performing of the merge operation to the memory controller from the host controller; and notifying, by the host controller, the host that a state of the memory system is converted into a busy state in response to entering the exclusive through the first and second entering operations.

The entering may further include checking a proportion of free memory blocks among the memory blocks through the memory controller, generating by the memory controller the exclusive mode entry request when the proportion of the free memory blocks is equal to or less than a predetermined value as a result of the checking, and transmitting the exclusive mode entry request to the host controller.

The entering may further include checking, when the merge operation is performed through the memory controller, a total number of valid pages included in victim memory blocks among the memory blocks, generating by the memory controller the exclusive mode entry request when the total number of valid pages is equal to or more than a predetermined value as a result of the checking, and transmitting the exclusive mode entry request to the host controller.

The entering may further include generating by the memory controller the exclusive mode entry request, each time when the merge operation is performed through the memory controller, and transmitting the exclusive mode entry request to the host controller.

The exiting may further include: an operation of exiting, by the host controller, the exclusive mode in response to the exclusive mode exit request transmitted from the memory controller to the host controller; and an operation of notifying, by the host controller, the host that a state of the memory system is converted into a ready state in response to exiting the exclusive mode through the operation of exiting.

The method may further include flushing, by the memory controller, data stored in the volatile memory device to the nonvolatile memory device in response to entering the exclusive mode through the entering, and then performing the exclusively using.

The method may further include converting, by the memory controller, a state of data updated to the nonvolatile memory device among data stored in the volatile memory device into a discard state in response to entering the exclusive mode through the entering, and then performing the exclusively using.

The merge operation may include an operation of merging valid data included in at least two victim memory blocks among the memory blocks, and transferring the merged valid data to a target memory block.

In an embodiment, a memory system may include: a nonvolatile memory device comprising a plurality of memory blocks, each of which includes a plurality of pages; a volatile memory device suitable for storing data delivered between a host and the nonvolatile memory device; and a controller suitable for entering an exclusive mode based on at least one of a request of the host, a state of the nonvolatile memory device and a merge operation performed on the nonvolatile memory device, exclusively using the volatile memory device for performing the merge operation during the exclusive mode, and exiting the exclusive mode in response to completion of the merge operation.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
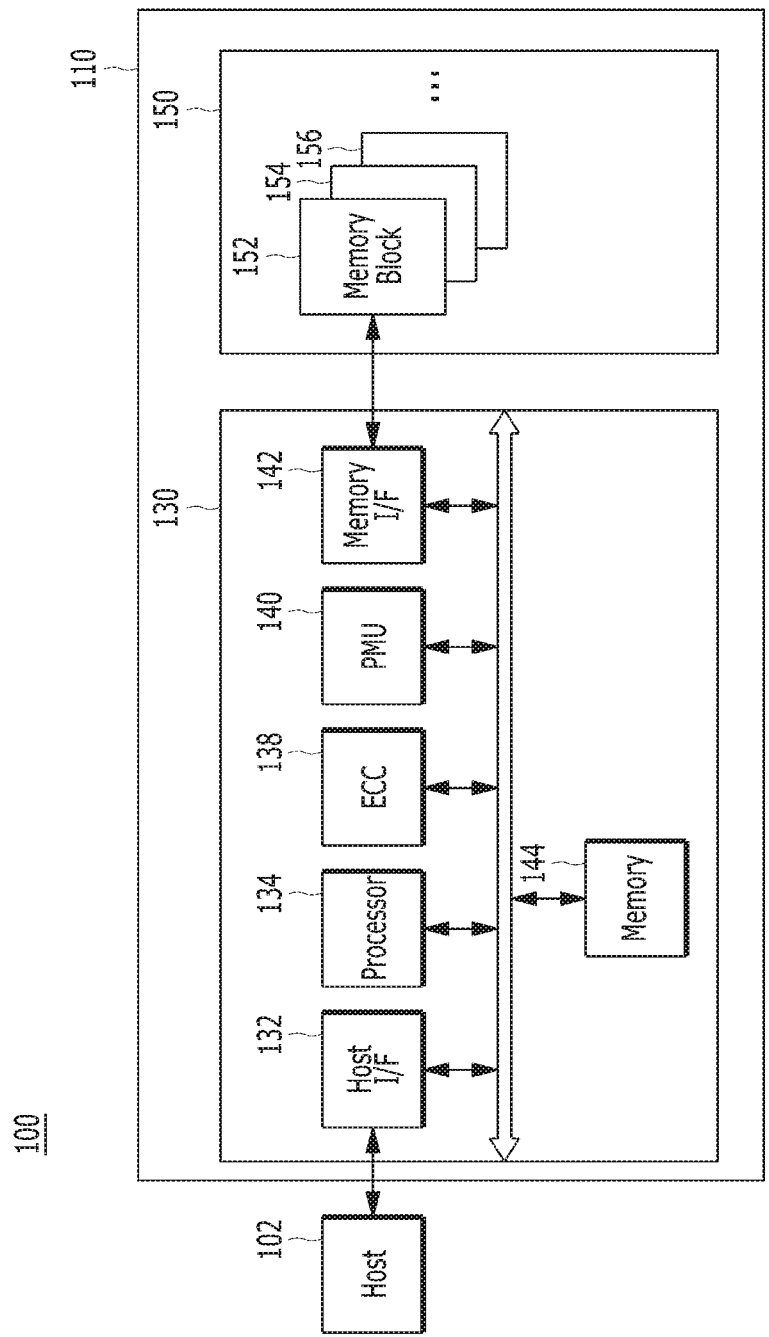
FIG. 1 is a block diagram illustrating a data processing system including a memory system in accordance with an embodiment of the invention.

Various embodiments of the invention are described below in more detail with reference to the accompanying drawings. We note, however, that the invention may be embodied in different other embodiments, forms and variations thereof and should not be construed as being limited to the embodiments set forth herein. Rather, the described embodiments are provided so that this disclosure will be thorough and complete, and will fully convey the invention to those skilled in the art to which this invention pertains. Throughout the disclosure, like reference numerals refer to like parts throughout the various figures and embodiments of the invention.

It will be understood that, although the terms "first" "second", "third", and so on may be used herein to describe various elements, these elements are not limited by these terms. These terms are used to distinguish one element from another element. Thus, a first element described below could also be termed as a second or third element without departing from the spirit and scope of the invention.

The drawings are not necessarily to scale and, in some instances, proportions may have been exaggerated to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for describing specific embodiments only and is not intended to be limiting of the invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art and will not be interpreted in an idealized or overly formal sense unless expressly so defined herein.

In the following description, numerous specific details are set forth in order to provide a thorough understanding of the invention. The present invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the invention.

Referring to FIG. 1, the data processing system 100 may include a host 102 and the memory system 110.

By the way of example but not limitation, the host 102 may include portable electronic devices such as a mobile phone, MP3 player and laptop computer or non-portable electronic devices such as a desktop computer, a game machine, a TV and a projector.

The memory system 110 may operate to store data for the host 102 in response to a request of the host 102. Non-limited examples of the memory system 110 may include a solid-state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), a reduced size MMC (RS-MMC) and a micro-MMC, The SD card may include a mini-SD card and a micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory. The flash memory may have a 3-dimensional (3D) stack structure.

The memory system 110 may include a memory device 150 and a controller 130. The memory device 150 may store data for the host 120. The controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation. The memory device 150 may provide data stored therein to the host 102 through a read operation. The memory device 150 may include a plurality of memory dies (not shown), each memory die including a plurality of planes (not shown), each plane including a plurality of memory blocks 152 to 156. Each of the memory blocks 152 to 156 may include a plurality of pages. Each of the pages may include a plurality of memory cells coupled to a word line.

The controller 130 may control the memory device 150 in response to a request from the host 102. By the way of example but not limitation, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144. Each of components may be electrically coupled with each other via an internal bus.

The host interface unit 132 may be configured to process a command and data of the host 102, and may communicate with the host 102 under one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (DATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success or fail signal. When the number of error bits is more than a threshold value of correctable error bits, the ECC unit 138 may not correct the error bits to output the error correction fail signal.

The ECC unit 138 may perform error correction through a coded modulation such as Low-Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may manage an electrical power used and provided in the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transmission between the controller 130 and the memory device 150.

The memory 144 may serve as a working memory of the memory system 110 and the controller 130. The memory 144 may store data supporting operation of the memory system 110 and the controller 130. The controller 130 may control the memory device 150 so that read, write, program and erase operations are performed in response to a request from the host 102. The controller 130 may output data read from the memory device 150 to the host 102, and may store data provided from the host 102 into the memory device 150. The memory 144 may store data required for the controller 130 and the memory device 150 to perform these operations.

The memory 144 may be embodied by a volatile memory. By the way of example but not limitation, the memory 144 may be embodied by a static random-access memory (SRAM) or a dynamic random access memory (DRAM). The memory 144 may be disposed within or out of the controller 130. FIG. 1 exemplifies an example of the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may use a firmware to control overall operations of the memory system 110. The firmware may be referred to as a flash translation layer (FTL).

The processor 134 of the controller 130 may include a management unit (not illustrated) for performing a bad management operation of the memory device 150. The management unit may perform a bad block management operation of checking a bad block, among the plurality of memory blocks 152 to 156 included in the memory device 150. The bad block may include a block where a program fail occurs during a program operation, due to the characteristic of a NAND flash memory. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
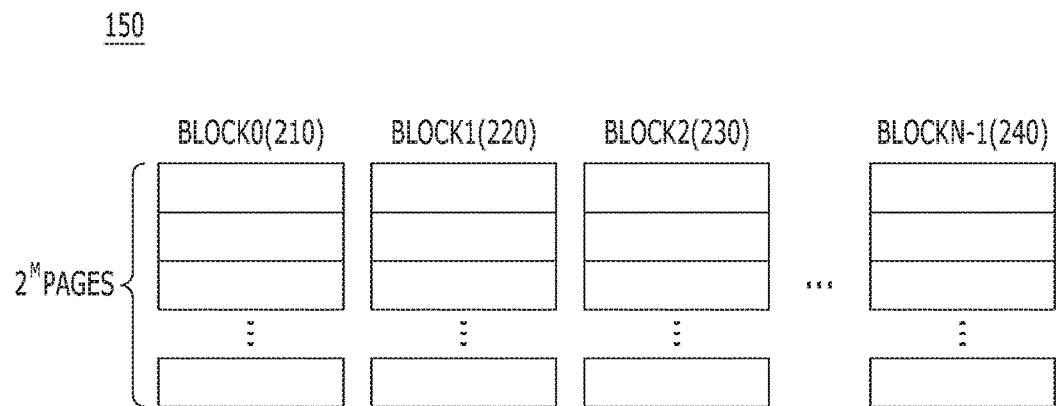
FIG. 2 is a schematic diagram illustrating an exemplary configuration of a memory device employed in the memory system shown in FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, or a multi-level cell (MLC) storing 2- or more bit data. In an embodiment, the memory device 150 may include a plurality of triple level cells (TLC), each storing 3-bit data. In another embodiment, the memory device may include a plurality of quadruple level cells (QLC), each storing 4-bit level cells.

Figure 3:
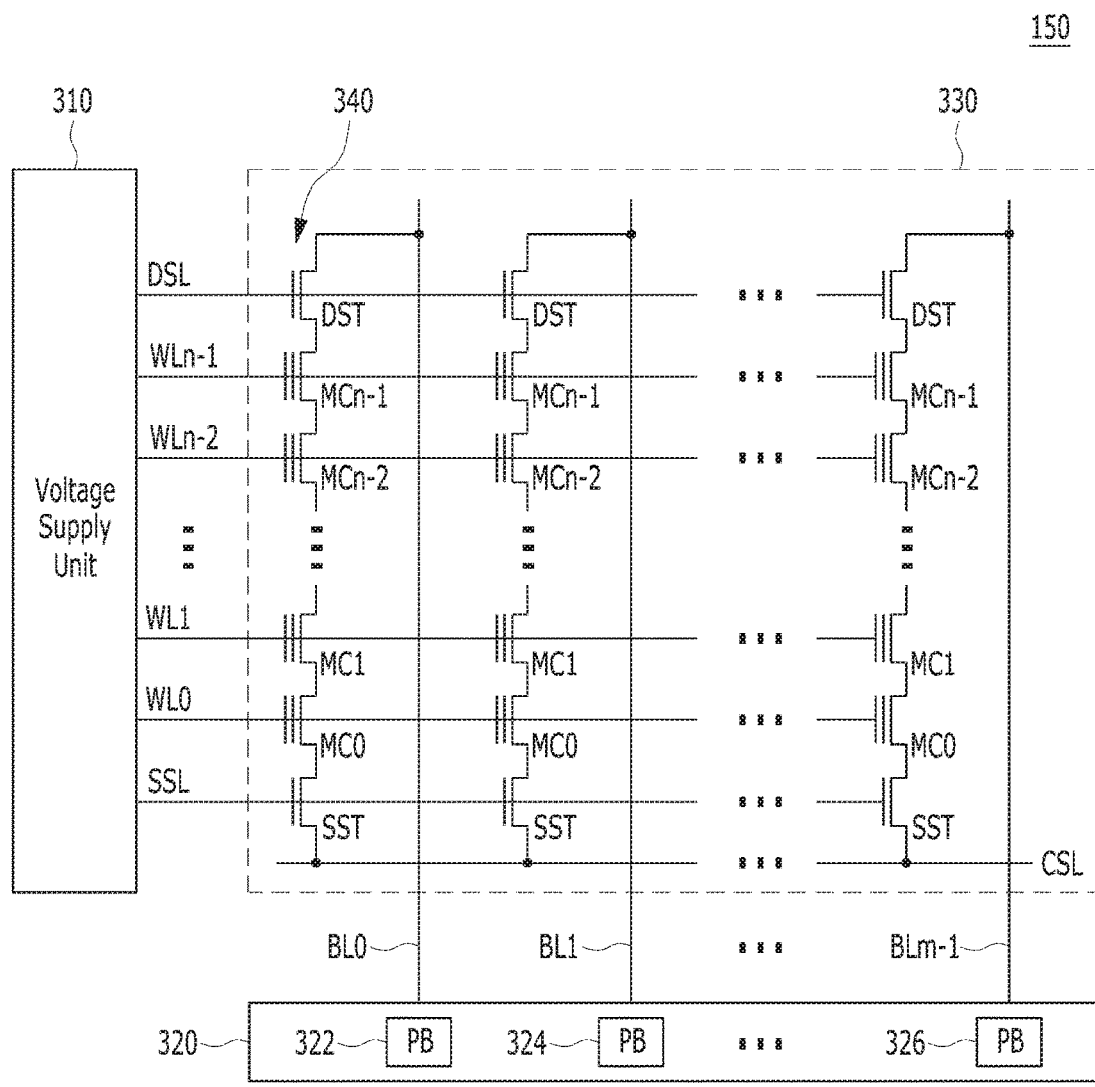
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST, SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode.

The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and may supply a current or a voltage onto bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
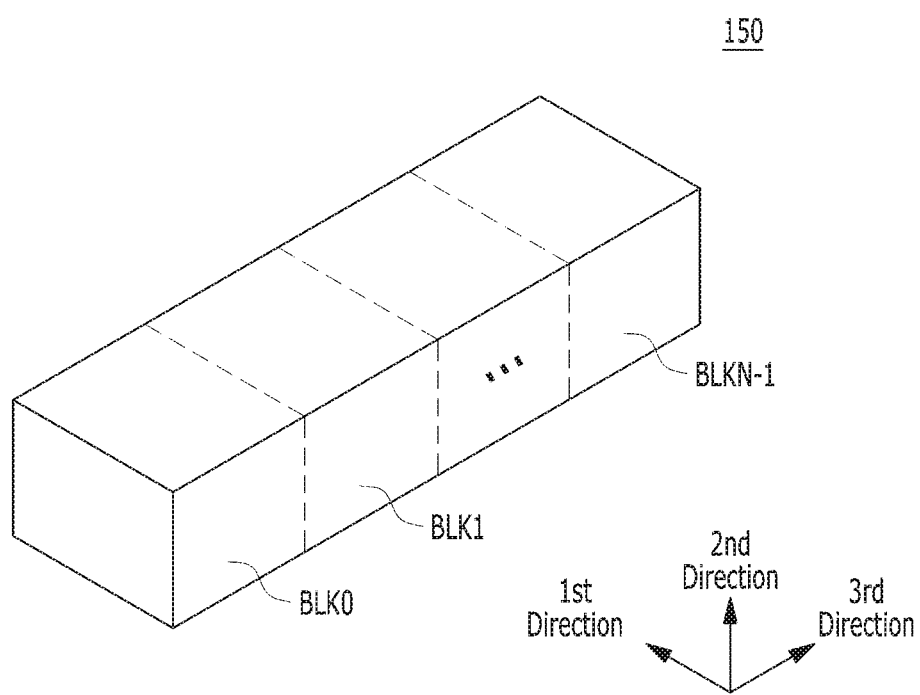
FIG. 4 is a schematic diagram illustrating an exemplary three-dimensional structure of the memory device shown in FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1 each having a 3D structure (or vertical structure).

Figure 5:
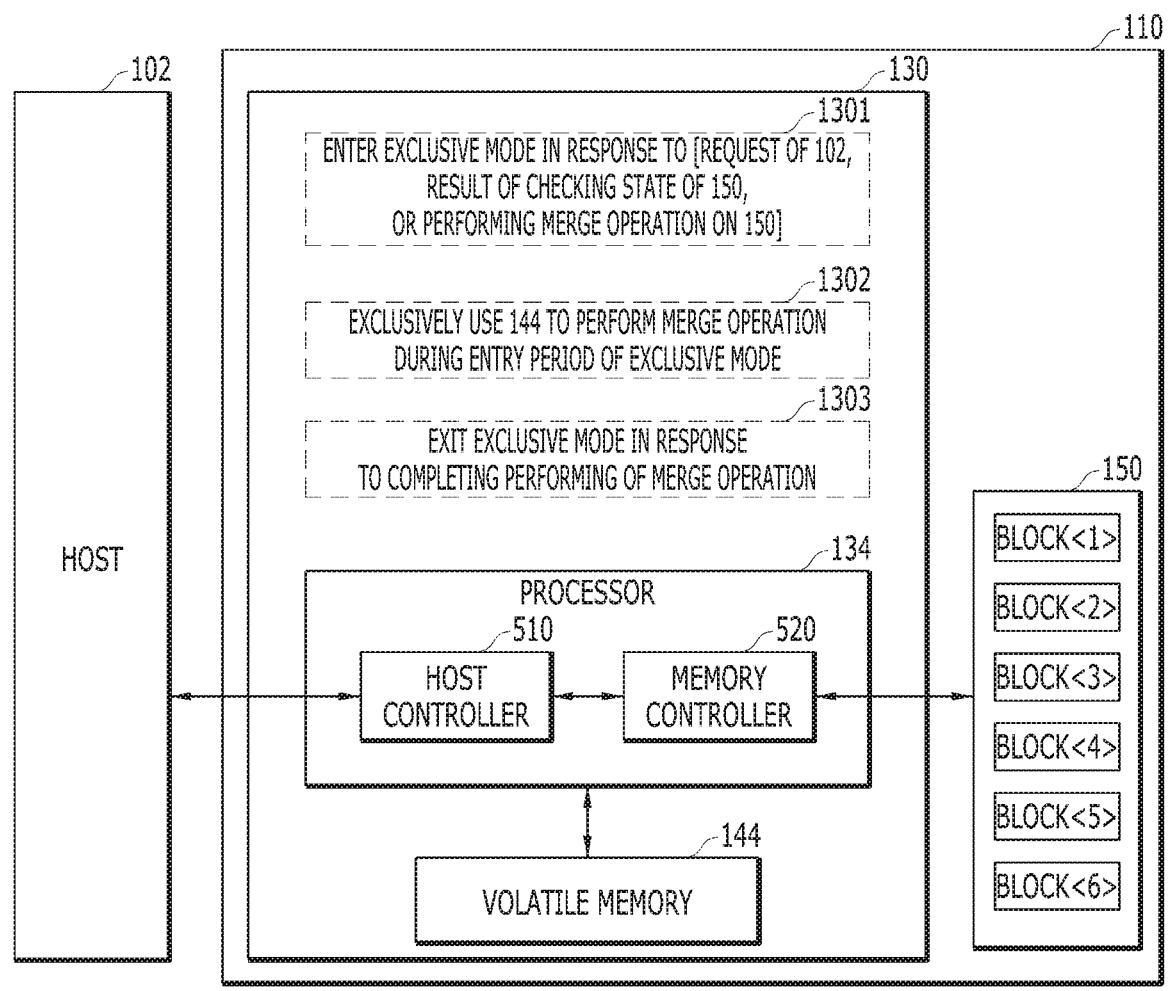
FIGS. 5 to 7 are diagrams illustrating a memory system in accordance with an embodiment.
Figure 6:
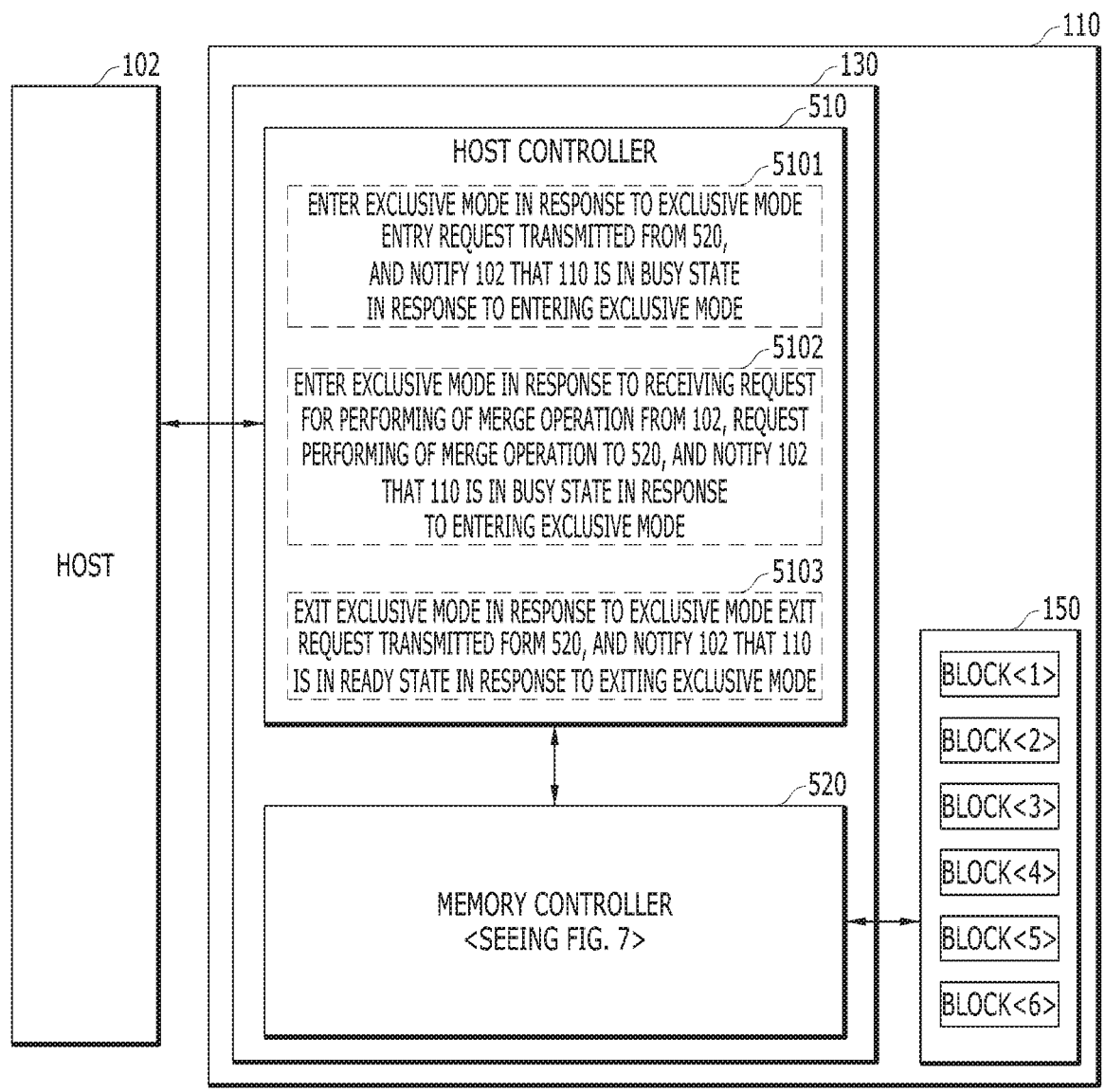
Figure 7:
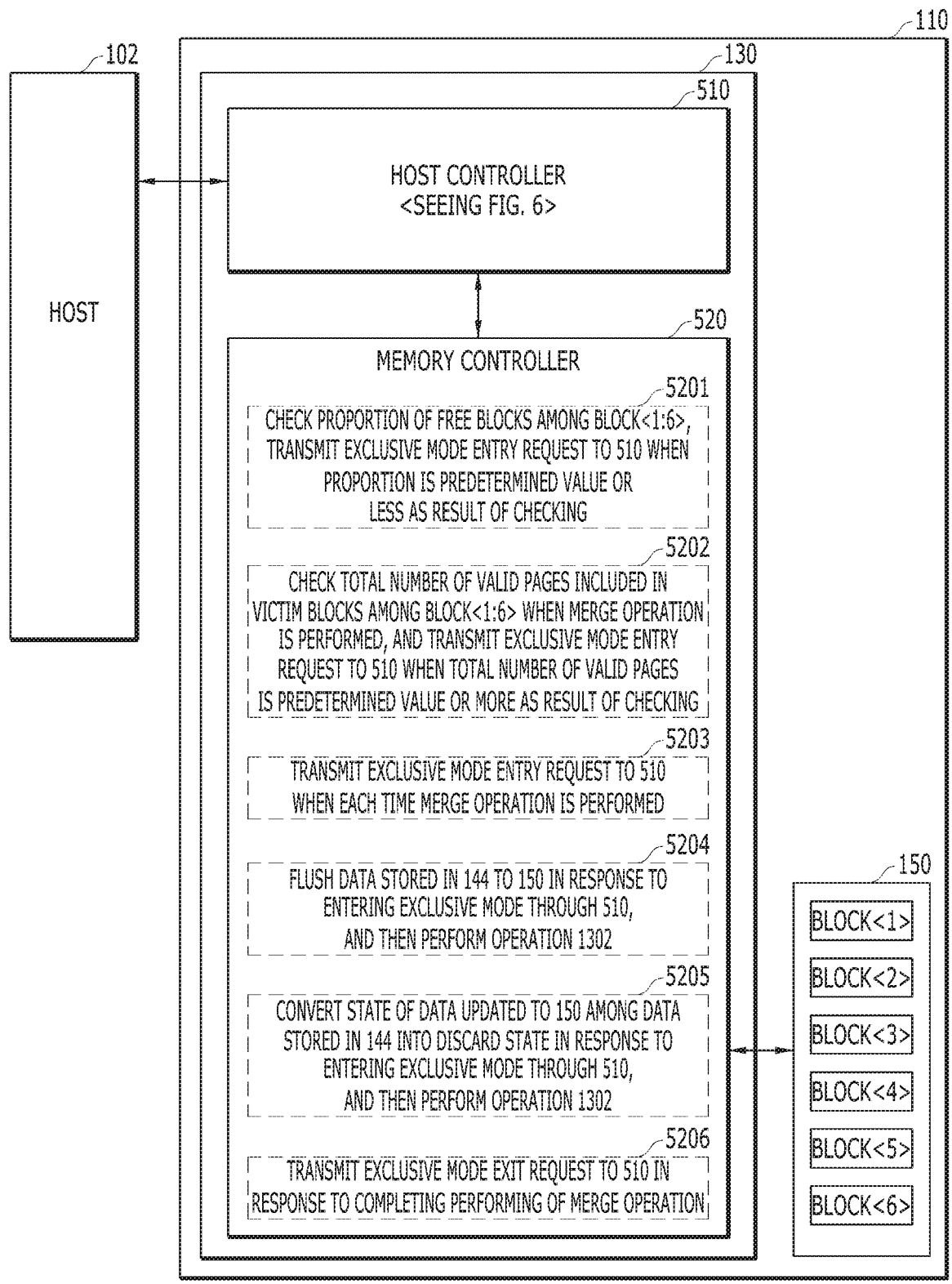

FIGS. 5 to 7 are diagrams illustrating an operation of a memory system in accordance with an embodiment.

Referring to FIGS. 5 to 7, it may be understood that the configuration of the data processing system 100 including the host 102 and the memory system 110 is illustrated with reference to the configuration of the data processing system 100 shown in FIG. 1.

The memory system 110 includes the controller 130 and the nonvolatile memory device 150, as described with reference to FIG. 1.

The controller 130 includes a processor 134 and a volatile memory 144. The processor 134 includes a host controller 510 and a memory controller 520.

Furthermore, the nonvolatile memory device 150 includes a plurality of memory blocks BLOCK<1:6>, as described with reference to FIG. 1. Here, each of the memory blocks BLOCK<1:6> includes a plurality of pages, as described with reference to FIG. 2.

FIGS. 5 to 7 illustrate a configuration in which only the single nonvolatile memory device 150 is included in the memory system 110 for the sake of convenience in explanation. Practically, a larger number of nonvolatile memory devices may be included. Furthermore, FIGS. 5 to 7 illustrate a configuration in which the six memory blocks BLOCK<1:6> are included in the nonvolatile memory device 150 only for the sake of convenience in explanation. Practically, a larger number of memory blocks may be included.

In addition, the host interface 132, the ECC unit 138, the power management unit 140, and the NAND flash controller 142 that have been illustrated in FIG. 1 as being included in the controller 130 are illustrated in FIGS. 5 to 7 as being not included in the controller 130. They are omitted from the drawings only for the sake of convenience in explanation. It is noted, however, that these elements of the controller may be practically, according to various embodiments, included in the controller 130.

Referring to FIG. 5, the nonvolatile memory device 150 includes the plurality of memory blocks BLOCK<1:6>. Each of the memory blocks BLOCK<1:6> includes a plurality of pages (not shown).

The volatile memory 144 may store temporarily data to be transmitted between the host 102 and the nonvolatile memory device 150. It is noted that the volatile memory 144 corresponds to the memory 144 described with reference to FIG. 1. The volatile memory 144 may be configured to be included in the controller 130, as shown in the drawing. For example, the volatile memory 144 may be configured to be provided outside the controller 130 in the memory system 110.

The controller 130 may enter an exclusive mode of operation. The controller 130 may enter an exclusive mode of operation in response to at least one of a request of the host 102, a result of checking the state of the nonvolatile memory device 150, and/or a merge operation performed on the nonvolatile memory device 150 (as shown by reference 1301).

After entering the exclusive mode through operation 1301, the controller 130 may use the volatile memory 144 exclusively for performing the merge operation during an entry period of the exclusive mode (as shown by reference 1302).

Furthermore, after performing the merge operation exclusively using the volatile memory 144 through operation 1302, the controller 130 may exit the exclusive mode upon completion of the merge operation (as shown by reference 1303).

Furthermore, the controller 130 may flush data stored in the volatile memory 144 to the nonvolatile memory device 150 in response to entering the exclusive mode through operation 1301.

The controller 130 may exclusively use an overall region of the volatile memory 144 to perform the merge operation during the entry period of the exclusive mode.

The operation of flushing the data stored in the volatile memory 144 to the nonvolatile memory device 150 may include copying all data which are stored in the volatile memory device 144 and storing them to a region in the nonvolatile memory device 150. After the flush operation is completed, the controller 130 may discard all data stored in the volatile memory 144 so that the whole region of the volatile memory 144 can be used exclusively for performing the merge operation.

Furthermore, in response to the exclusive mode entered through operation 1301, the controller 130 may convert the state of data which are updated to the nonvolatile memory device 150 among the data stored in the volatile memory 144, into a discard state.

In this case, the controller 130 may perform the merge operation during the entry period of the exclusive mode, by exclusively using a region that is wider than a region designated for a general merge operation in the volatile memory 144.

Here, as described with reference to FIG. 1, because the volatile memory 144 may be used for various purposes, e.g., as a write buffer/cache, a read buffer/cache, and a map buffer/cache, an internal storage space of the volatile memory 144 is generally divided into various regions according to the various uses, and the divided regions are separately managed. Therefore, in the case of the normal volatile memory 144, some region of the internal storage space thereof may be predesignated as a region for the merge operation.

Here, in response to the exclusive mode entered through operation 1301, the controller 130 in accordance with the embodiment may convert, into a discard state, the state of data updated to the nonvolatile memory device 150 among data stored in regions of the storage space of the volatile memory 144 that are not predesignated as the region for the merge operation. Consequently, the controller 130 in accordance with the embodiment may exclusively use, to perform the merge operation during the entry period of the exclusive mode, a region wider than the region designated for the general merge operation in the volatile memory 144.

The data updated to the nonvolatile memory device 150 among the data stored in the volatile memory 144 may include data that have been already stored to the nonvolatile memory device 150 through an operation such as a checkpoint operation among the data stored in the volatile memory 144. Therefore, it is possible for the controller 130 to convert the state of the data updated to the nonvolatile memory device 150 among the data stored in the volatile memory 144 into the discard state during the exclusive mode entry period, and then use the corresponding region to perform the merge operation.

In response to the exclusive mode entered through operation 1301, the controller 130 may convert the state of the memory system 110 into a busy state, and may notify the host 102 that the memory system is in a busy state.

When the host 102 receives the notification that the memory system 110 is in the busy state through the operation of the controller 130, the controller 130 may not receive an arbitrary request such as a is read request or a write request from the host 102 while the merge operation is performed in the exclusive mode through operation 1302.

Furthermore, in response to exiting the exclusive mode through operation 1303, the controller 130 may convert the state of the memory system 110 into a ready state and may provide notification thereof to the host 102.

In this way, since the host 102 recognizes that the memory system 110 is in the ready state, the controller 130 may receive an arbitrary request such as a read request or a write request from the host 102 again after exiting the exclusive mode through operation 1303.

The merge operation may include merging the valid data which are included in at least two victim memory blocks among the memory blocks BLOCK<1:6> of the nonvolatile memory device 150, and transferring the merged valid data to a target memory block.

For example, the merging operation may be a garbage collection operation, a read reclaim operation, a wear leveling operation, or a map update operation.

Because the merge operation may be defined as described above, the controller 130 may select whether to enter the exclusive mode according to the following four kinds of conditions, in the operation 1301.

The first condition of the controller 130 in the operation 1301 corresponds to the case where a proportion of free memory blocks among the memory blocks BLOCK<1:6> included in the nonvolatile memory device 150 is checked. When the proportion is equal to or less than a predetermined value as a result of the checking and thus there is a need to perform the merge operation, the controller 130 enters the exclusive mode. If the proportion as checked is greater than the predetermined value, there is no need to perform the merge operation so that the controller 130 does not enter the exclusive mode. In other words, the above-mentioned first condition corresponds to the case where, when the controller 130 determines that there is a need to perform the merge operation, the controller 130 enters the exclusive mode and performs the merge operation.

The second condition of the controller 130 in operation 1301 corresponds to the case where the total number of valid pages included in victim memory blocks among the memory blocks BLOCK<1:6> is checked when the merge operation is performed. When the total number of valid pages is equal to or greater than a predetermined value as checked, the controller 130 enters the exclusive mode. If the total number of valid pages as checked is less than the predetermined value, the controller 130 may not enter the exclusive mode. In other words, the above-mentioned second condition corresponds to the case where, even when it has been determined to perform the merge operation, only when there are a sufficient number of valid pages included in the victim memory blocks can the controller 130 enter the exclusive mode and perform the merge operation.

The third condition of the controller 130 in operation 1301 corresponds to the case where, when the merge operation is performed, the controller 130 may unconditionally enter the exclusive mode. In other words, the above-mentioned third condition corresponds to the case where, if it has been determined to perform the merge operation, the controller 130 unconditionally enters the exclusive mode without performing an additional determination operation unlike that of the above-stated second condition, and then performs the merge operation.

The fourth condition of the controller 130 in operation 1301 corresponds to the case where, when the merge operation is performed in response to a request from the host 102, the controller 130 may enter the exclusive mode. In other words, the above-mentioned fourth condition corresponds to the case where, if the merge operation should be performed in response to a request from the host 102, the controller 130 unconditionally enters the exclusive mode in the same manner as that of the above-stated third condition, and then performs the merge operation.

For reference, as described above, in operation 1301, the controller 130 may enter the exclusive mode under different kinds of conditions. A designer may select conditions under which the controller 130 enters the exclusive mode. In the above-mentioned embodiment, although only the operation complying with the first condition in which the proportion of free memory blocks among the memory blocks BLOCK<1:6> included in the nonvolatile memory device 150 should be checked has been described as corresponding to the case where the controller 130 performs the merge operation according to its own determination, this is only one embodiment. In other words, the case where the controller 130 performs the merge operation according to its own determination is not limited to the operation complying with the first condition. Depending on a designer's choice, the scheme in which the controller 130 selects whether to perform the merge operation according to its own determination may be changed.

As shown in FIG. 5, the controller 130 includes the processor 134. The processor 134 includes the host controller 510 and the memory controller 520. Therefore, the above-mentioned operations 1301, 1302, 1303 of the controller 130 may focus on the operations of the host controller 510 and the memory controller 520 included in the processor 134 of the controller 130. However, focusing the above-mentioned operations 1301, 1302, 1303 of the controller 130 in accordance with the embodiment on the operations of the host controller 510 and the memory controller 520 included in the processor 134 of the controller 130 is intended to illustrate only one embodiment. It is to be noted that the above-mentioned operations 1301, 1302, 1302 of the controller 130 may also be embodied using various other components according to a designer's choice.

Here, the host controller 510 may process operations with the host 102. By the way of example but not limitation, referring to FIG. 1, the host controller 510 along with the memory controller 520 may be included in the processor 134 such that the host controller 510 and the memory controller 520 are coupled to each other. The host controller 510 may process operations with the host 102 through the host interface unit 132.

The memory controller 520 may be coupled to the host controller 510. The memory controller 520 may process operations with the nonvolatile memory device 150.

Referring together to FIG. 1, the memory controller 520 along with the host controller 510 may be included in the processor 134 such that the memory controller 520 and the host controller 510 are coupled to each other. The memory controller 520 may process operations with the nonvolatile memory device 150 through the NAND flash controller 142.

With the operations of the host controller 510 and the memory controller 520 included in the processor 134 of the controller 130, as shown in FIGS. 6 and 7, the above-mentioned operations 1301, 1302, 1303 of the controller 130 will be more specifically described.

In detail, referring to FIG. 6, the host controller 510 may select whether to enter the exclusive mode according to the following two kinds of conditions.

According to the first condition the host controller 510 enters the exclusive mode in response to an exclusive mode entry request transmitted from the memory controller 520. In other words, the host controller 510 may enter the exclusive mode in response to an exclusive mode entry request transmitted from the memory controller 520, convert the state of the memory system 110 into a busy state in response to entering the exclusive mode, and then provide notification thereof to the host 102 (as shown by reference 5101).

According to the second condition the host controller 510 enters the exclusive mode in response to a request to perform the merge operation from the host 102. In other words, the host controller 510 may enter the exclusive mode in response to a request to perform the merge operation from the host 102, request the memory controller 520 to perform the merge operation, convert the state of the memory system 110 into the busy state in response to entering the exclusive mode, and then provide notification thereof to the host 102 (as shown by reference 5102). In operation 5102, the host controller 510 may request the memory controller 520 to perform the merge operation, in response to a merge operation request from the host 102. Hence, the memory controller 520 may unconditionally perform the merge operation in response to operation 5102 without performing an additional operation of selecting whether to perform the merge operation in response to the merge operation request from the host controller 510.

Since the host 102 recognizes that the memory system 110 is in the busy state through the operation of the host controller 510 after having entered the exclusive mode, the host controller 510 may not receive an arbitrary request such as a read request or a write request from the host 102 during the exclusive mode entry period.

The host controller 510 may exit the exclusive mode in response to an exclusive mode exit request transmitted from the memory controller 520. In other words, the host controller 510 may exit the exclusive mode in response to the exclusive mode exit request transmitted from the memory controller 520, convert the state of the memory system 110 into a ready state in response to exiting the exclusive mode, and then provide notification thereof to the host 102 (as shown by reference 5103).

As such, since the host 102 recognizes that the memory system 110 is in the ready state through the operation of the host controller 510 after having exited the exclusive mode, the host controller 510 may receive, after having exited the exclusive mode, an arbitrary request such as a read request or a write request from the host 102.

Referring to FIG. 7, the memory controller 520 may generate an exclusive mode entry request according to the following three kinds of conditions in a state prior to entering the exclusive mode through the host controller 510. The memory controller 520 may transmit the exclusive mode entry request to the host controller 510.

According to the first condition, the proportion of free memory blocks among the memory blocks BLOCK<1:6> included in the nonvolatile memory device 150 is checked, and, when the proportion is equal to or less than a predetermined value, the memory controller 520 generates an exclusive mode entry request and transmits it to the host controller 510 (as shown by reference 5201). If the proportion is greater than the predetermined value, the memory controller 520 may generate no exclusive mode entry request. In other words, the above-mentioned first condition may correspond that when the number of free memory blocks is substantially smaller or relatively smaller than that of other memory blocks in the nonvolatile memory device and there is a need to perform the merge operation, the memory controller 520 generates the exclusive mode entry request and transmits it to the host controller 510 so that the merge operation may be performed.

According to the second condition the total number of valid pages included in victim memory blocks among the memory blocks BLOCK<1:6> is checked when the merge operation is performed, and, when the total number of valid pages is equal to or more than a predetermined value as checked, the memory controller 520 generates an exclusive mode entry request and transmits it to the host controller 510 (as shown by reference 5202). If, as a result of the checking, the total number of valid pages is less than the predetermined value, the memory controller 520 may generate no exclusive mode entry request. In other words, the above-mentioned second condition may be a case of the merge operation performed after the memory controller 520 generates the exclusive mode entry request and transmits it to the host controller 510 so that the merge operation may be performed when there are a sufficient number of valid pages included in the victim memory blocks.

The third condition corresponds to the case where the memory controller 520 unconditionally generates an exclusive mode entry request and transmits it to the host controller 510 (as shown by reference 5203) during the merge operation. In other words, the above-mentioned third condition may be a case where, during the merge operation, the memory controller 520 unconditionally generates the exclusive mode entry request without performing an additional determination operation unlike that of the above-stated second condition, and then transmits the exclusive mode entry request to the host controller 510 so that the merge operation may be performed.

For reference, as described above, the memory controller 520 may include different kinds of conditions under which an exclusive mode entry request is generated. The designer may select conditions under which the memory controller 520 generates the exclusive mode entry request and transmits it to the host controller 510. In the above-mentioned embodiment, although only the operation complying with the first condition in which the proportion of free memory blocks among the memory blocks BLOCK<1:6> included in the nonvolatile memory device 150 is checked has been described as corresponding to the case where the memory controller 520 generates the exclusive mode entry request according to its own determination, this is only one embodiment. In other words, the case where the memory controller 520 generates the exclusive mode entry request according to its own determination is not limited to the operation complying with the first condition. Depending on a designer's choice, the scheme in which the memory controller 520 selects whether to generate the exclusive mode entry request according to its own determination may be changed.

Furthermore, the memory controller 520 may flush data stored in the volatile memory 144 to the nonvolatile memory device 150 in response to entering the exclusive mode through the host controller 510 (as shown by reference 5204).

In this case, the memory controller 520 may exclusively use the overall region of the volatile memory 144 to perform the emerge operation during the entry period of the exclusive mode.

Here, the operation of flushing the data stored in the volatile memory 144 to the nonvolatile memory device 150 may include copying all of the data stored in the volatile memory device 1400 and storing the data to a set region formed in the nonvolatile memory device 150. Hence, after the flush operation, the memory controller 520 may convert the state of all data stored in the volatile memory 144 into a discard state, so that an overall region of the volatile memory 144 may be exclusively used to perform the merge operation.

Furthermore, in response to entering the exclusive mode through the host controller 510, the memory controller 520 may convert the state of data updated to the nonvolatile memory device 150 among the data stored in the volatile memory 144, into a discard state (as shown by reference 5205).

In this case, the memory controller 520 may exclusively use, to perform the merge operation during the entry period of the exclusive mode, a region wider than a region designated for a general merge operation in the volatile memory 144.

Here, as described with reference to FIG. 1, because the volatile memory 144 may be used for various purposes, e.g., as a write buffer/cache, a read buffer/cache and a map buffer/cache, an internal storage space of the volatile memory 144 is generally divided into various regions according to purposes of use, and the divided regions are separately managed. Therefore, in the normal volatile memory 144, some region of the internal storage space thereof may be predesignated as a region for the merge operation.

Here, in response to entering the exclusive mode through the host controller 510, the memory controller 520 in accordance with the embodiment may convert, into a discard state, the state of data updated to the nonvolatile memory device 150 among data stored in regions of the storage space of the volatile memory 144 that are not predesignated as the region for the merge operation. Consequently, the memory controller 520 in accordance with the embodiment may exclusively use, to perform the merge operation during the entry period of the exclusive mode, a region wider than the region designated for the general merge operation in the volatile memory 144.

Furthermore, the data updated to the nonvolatile memory device 150 among the data stored in the volatile memory 144 means data that have been already stored to the nonvolatile memory device 150 through an operation such as a checkpoint operation among the data stored in the volatile memory 144. Therefore, it is possible for the memory controller 520 to convert the state of the data updated to the nonvolatile memory device 150 among the data stored in the volatile memory 144 into the discard state during the exclusive mode entry period, and then use the corresponding region to perform the merge operation.

Furthermore, after performing the merge operation exclusively using the volatile memory 144 during the entry period of the exclusive mode, the memory controller 520 may generate an exclusive mode exit request in response to completing the merge operation and transmit it to the host controller 510 (as shown by reference 5206). Thereby, the memory controller 520 may exit the exclusive mode through the host controller 510.

FIGS. 8 to 16 are diagrams schematically illustrating application examples of the data processing system of FIG. 1.

Figure 8:
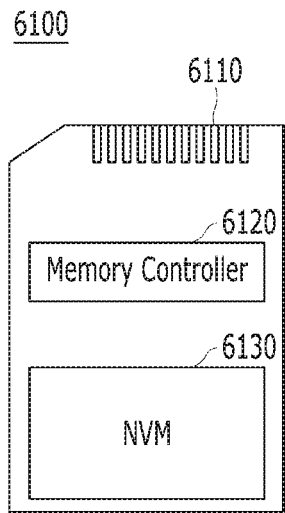
FIGS. 8 to 16 are diagrams schematically illustrating application examples of the data processing system shown in FIG. 1 in accordance with various embodiments of the invention.

FIG. 8 is a diagram schematically illustrating another example of the data processing system including the memory system in accordance with the embodiment. FIG. 8 schematically illustrates a memory card system to which the memory system in accordance with the embodiment is applied.

Referring to FIG. 8, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By the way of example but not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 5. The memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the embodiment may be applied to wired/wireless electronic devices or specific mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, an MMCmicro and an eMMC), an SD card (e.g., a SD, a miniSD, a microSD and an SDHC) and a universal flash storage (UFS).

Figure 9:
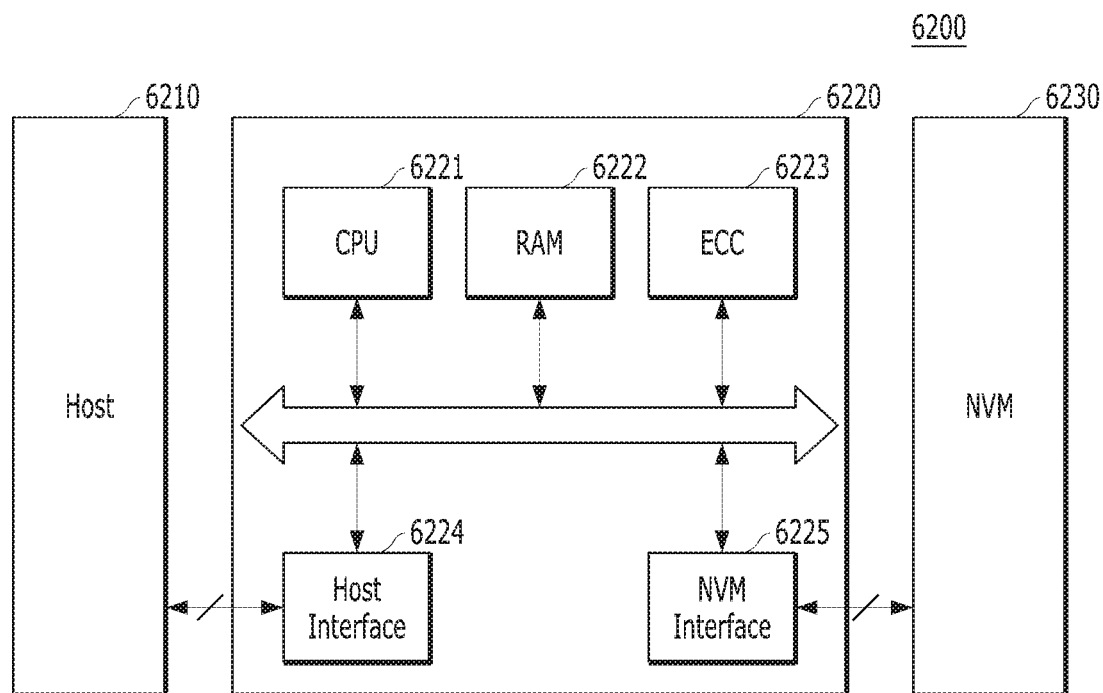

FIG. 9 is a diagram schematically illustrating another example of the data processing system including the memory system in accordance with the embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long-Term Evolution (LTE). The memory controller 6220 may be connected to an external device, for example, the host 6210 or another external device, and then transmit/receive data to/from the external device. Specifically, as the memory controller 6220 is configured to communicate with the external device through one or more of various communication protocols, the memory system and the data processing system in accordance with the present embodiment may be applied to wired/wireless electronic devices or particularly a mobile electronic device.

Figure 10:
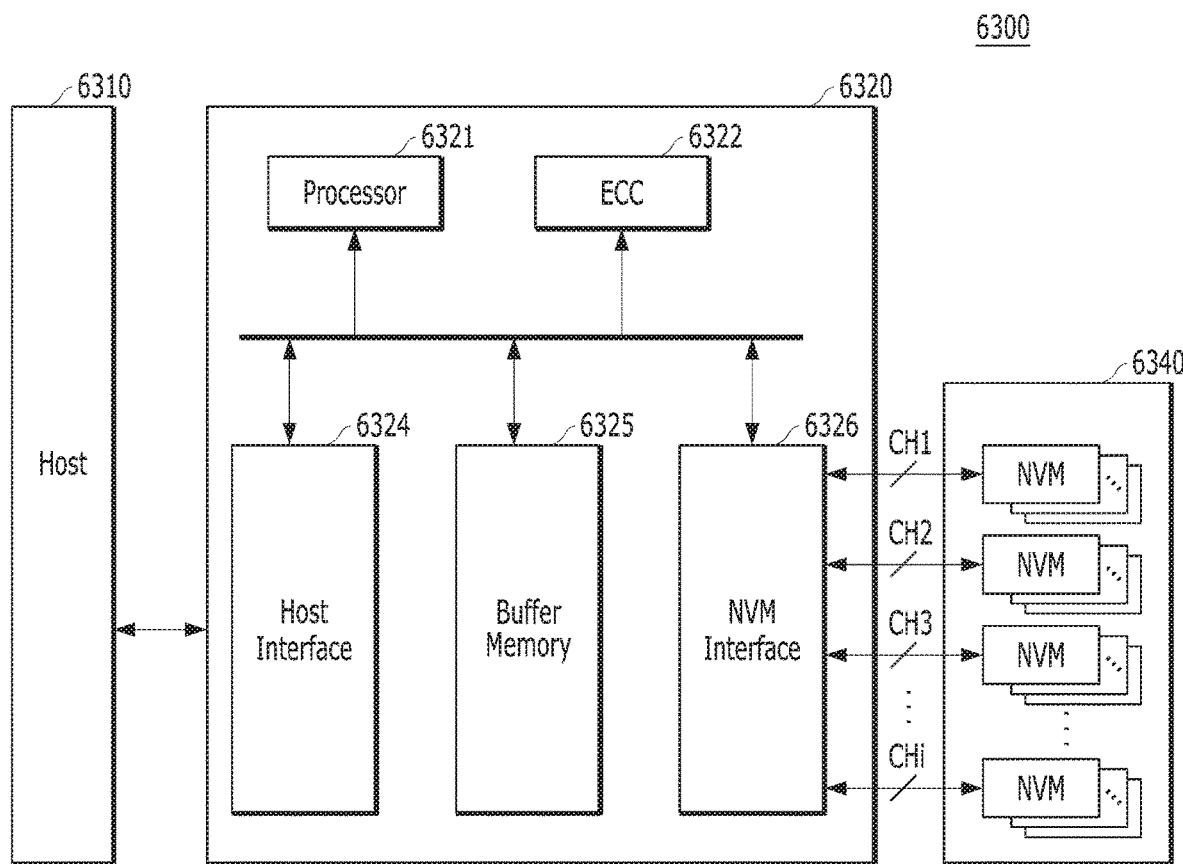

FIG. 10 is a diagram schematically illustrating another example of the data processing system including the memory system in accordance with the embodiment. FIG. 10 schematically illustrates an SSD to which the memory system in accordance with the embodiment is applied.

Referring to FIG. 10, the SSD 6300 may include a controller 6320 and a memory device 6340 including a plurality of nonvolatile memories. The controller 6320 may correspond to the controller 130 in the memory system 110 of FIGS. 1 and 5. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 9 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 11:
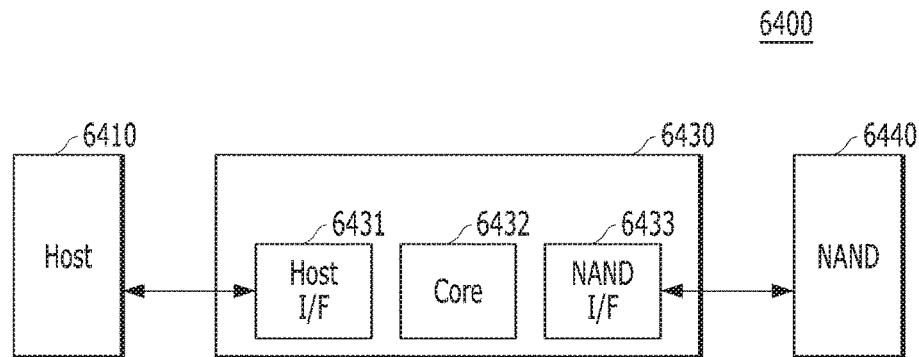

FIG. 11 is a diagram schematically illustrating another example of the data processing system including the memory system in accordance with the embodiment. FIG. 11 schematically illustrates an embedded Multi-Media Card (eMMC) to which the memory system in accordance with the embodiment is applied.

Referring to FIG. 11, the eMMC 6400 may include a controller 6430 and a memory device 6440 embodied by one or more NAND flash memories. The controller 6430 may correspond to the controller 130 in the memory system 110 of FIGS. 1 and 5. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system in accordance with the embodiment. FIGS. 12 to 15 schematically illustrate UFS (Universal Flash Storage) systems to which the memory system in accordance with the embodiment is applied.

Referring to FIGS. 12 to 15, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 9 to 11, and the UFS cards 6530, 6630, 6730, 6830 may be embodied in the form of the memory card system 6100 described with reference to FIG. 8.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, an MMC, a SD, a mini-SD, and a micro-SD.

Figure 12:
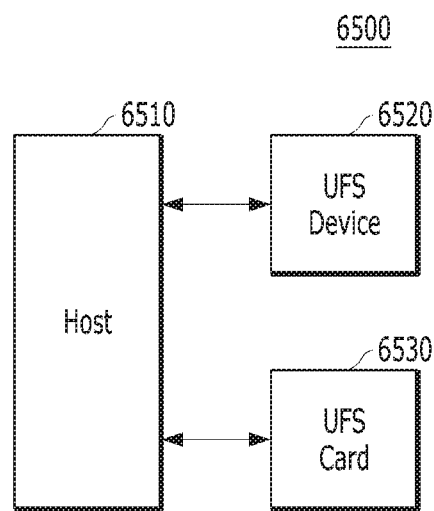

In the UFS system 6500 illustrated in FIG. 12, each of the host 6510, the UFS device 6520 and the UFS card 6530 may include UniPro. The host 6510 may perform a switching operation to communicate with the UFS device 6520 and the UFS card 6530. Particularly, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410. The form of a star may be implemented as a sort of arrangements where a single component is coupled to plural devices for a centralized processing operation. A plurality of UFS cards may be connected in parallel or in the form of a star to the UFS device 6520 or connected in series or in the form of a chain to the UFS device 6520.

Figure 13:
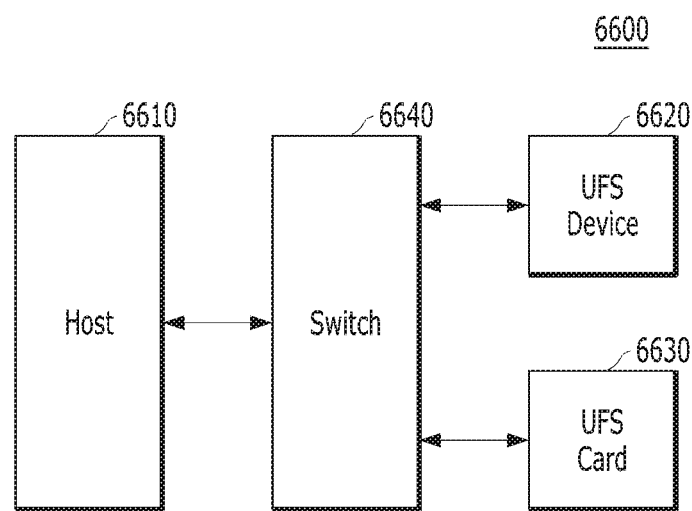

In the UFS system 6600 illustrated in FIG. 13, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640. A plurality of UFS cards may be connected in series or in the form of a chain to the UFS device 6620.

Figure 14:
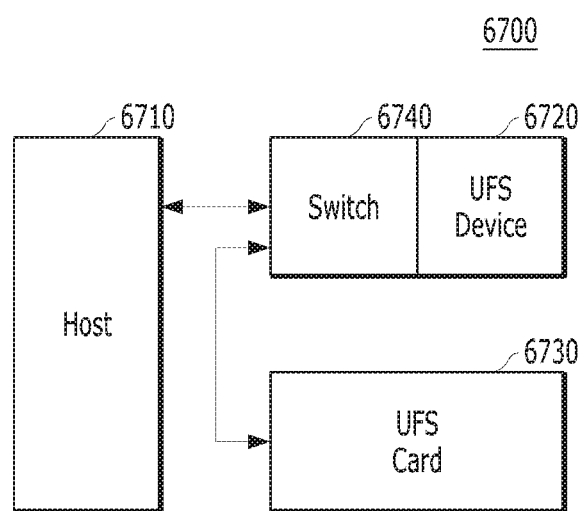

In the UFS system 6700 illustrated in FIG. 14, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro. The switching module 6740 may be integrated as one module with the UFS device 6720 inside or outside the UFS device 6720. In the embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 15:
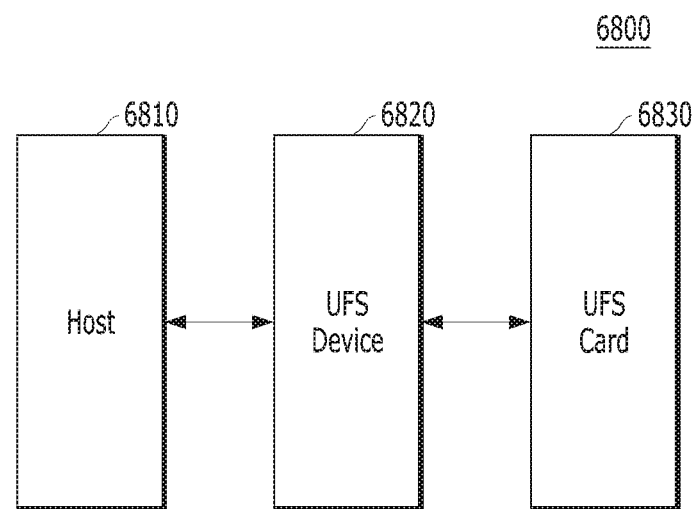

In the UFS system 6800 illustrated in FIG. 15, each of the host 6810, the UFS device 6820 and the UFS card 6830 may include M-PHY and UniPro. The UFS device 6820 may perform a switching operation to communicate with the host 6810 and the UFS card 6830. Particularly, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The is host 6810 and the UFS card 6830 may communicate with each other through target ID switching between the M-PHY and UniPro modules of the UFS device 6820. In the embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 16:
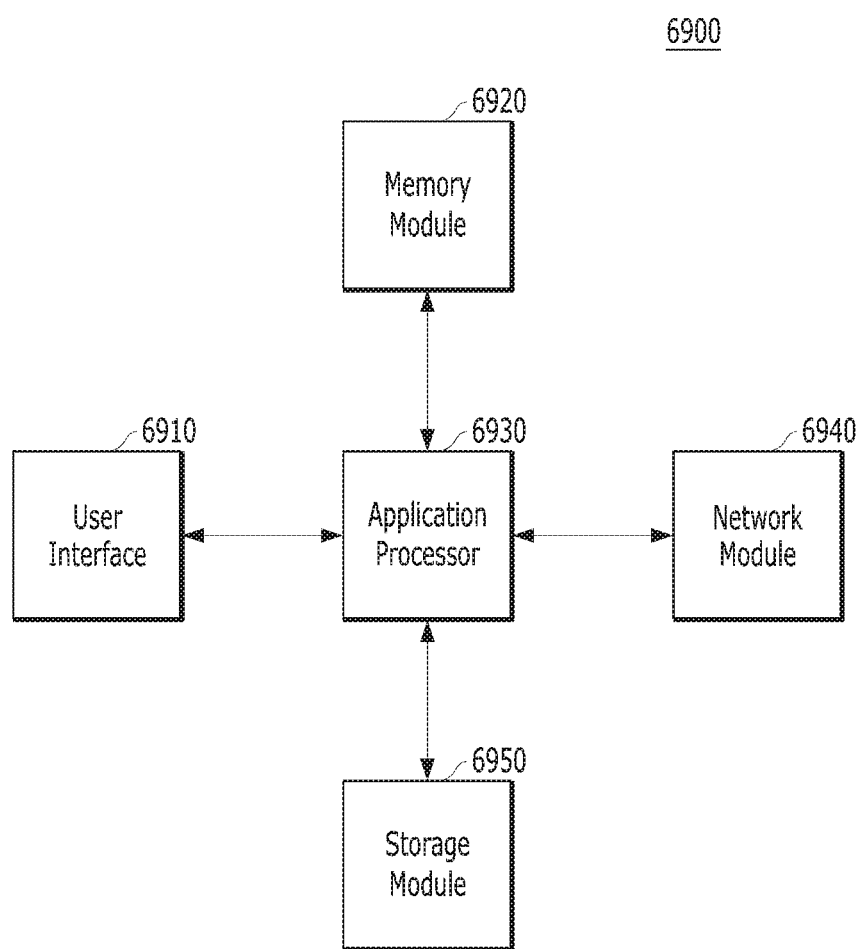

FIG. 16 is a diagram schematically illustrating another example of the data processing system including the memory system in accordance with an embodiment. FIG. 16 is a diagram schematically illustrating a user system to which the memory system in accordance with the embodiment is applied.

Referring to FIG. 16, the user system 6900 may include an application processor 6930, a memory module 6920, a network module 6940, a storage module 6950 and a user interface 6910.

Particularly, the application processor 6930 may use components included in the user system 6900, for example, an OS. The application processor 6930 may include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDARM, a LPDDR3 SDRAM or a LPDDR3 SDRAM or a nonvolatile RAM such as a PRAM, a ReRAM, a MRAM or a FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied with a nonvolatile semiconductor memory device such as a phase-change RAM (PRAM), a magnetic RAM (MRAM), a resistive RAM (ReRAM), a NAND flash, a NOR flash and a 3D NAND flash. The storage module 6950 may be provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, an eMMC and an UFS as described above with reference to FIGS. 10 to 15.

The user interface 6910 may include interfaces for inputting data or commands to the application processor 6930 or outputting data to an external device. For example, the user interface 6910 may include some user input interfaces such as a keyboard, a keypad, a button, a touch panel, a touch screen, a touch pad, a touch ball, a camera, a microphone, a gyroscope sensor, a vibration sensor and a piezoelectric element, and other user output interfaces such as a liquid crystal display (LCD), an organic light emitting diode (OLED) display device, an active matrix OLED (AMO-LED) display device, an LED, a speaker and a motor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. The user interface 6910 may support a function of receiving data from the touch panel.

In various embodiments, after a memory system enters an exclusive mode in response to a request of a host in response to a result of checking a state of a nonvolatile memory device or a merge operation performed on the nonvolatile memory device, a volatile memory device can be exclusively used to perform a merge operation in an exclusive mode. As a result, the performance of the memory system in performing the merge operation may be improved, enhanced or maximized.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a nonvolatile memory device comprising a plurality of memory blocks each of which includes a plurality of pages;
a volatile memory device configured to temporarily store data to be transmitted between a host and the nonvolatile memory device; and
a controller configured to enter an exclusive mode in response to at least one of a request of the host, a result of checking a state of the nonvolatile memory device and a merge operation performed on the nonvolatile memory device, to exclusively use the volatile memory device to perform the merge operation during an entry period of the exclusive mode, and to exit the exclusive mode in response to completing the merge operation.

2. The memory system of claim 1, wherein the controller comprises:
a host controller configured to process an operation between the controller and the host;
a memory controller coupled with the host controller, and configured to process an operation between the controller and the nonvolatile memory device, and
wherein the memory controller transmits an exclusive mode exit request to the host controller in response to completing the performing of the merge operation.

3. The memory system of claim 2,
wherein the host controller enters the exclusive mode in response to an exclusive mode entry request transmitted from the memory controller, and notifies the host of conversion into a busy state in response to entering the exclusive mode, and
wherein the host controller exits the exclusive mode in response to the exclusive mode exit request transmitted from the memory controller, and notifies the host of conversion into a ready state in response to exiting the exclusive mode.

4. The memory system of claim 3, wherein the memory controller checks a proportion of free memory blocks among the memory blocks, and transmits the exclusive mode entry request to the host controller when the proportion of the free memory blocks is equal to or less than a predetermined value as a result of the checking.

5. The memory system of claim 3, wherein the memory controller checks, when the merge operation is performed, a total number of valid pages included in victim memory blocks among the memory blocks, and transmits the exclusive mode entry request to the host controller when the total number of valid pages is equal to or greater than a predetermined value as a result of the checking.

6. The memory system of claim 3, wherein the memory controller transmits the exclusive mode entry request to the host controller each time the merge operation is performed.

7. The memory system of claim 2,
wherein the host controller enters the exclusive mode in response to receiving a request for the performing of the merge operation from the host, requests a performance of the merge operation to the memory controller, and notifies the host of conversion into a busy state in response to entering the exclusive mode, and
wherein the host controller exits the exclusive mode in response to the exclusive mode exit request transmitted from the memory controller, and notifies the host of conversion into a ready state in response to exiting the exclusive mode.

8. The memory system of claim 2, wherein the memory controller flushes data stored in the volatile memory device to the nonvolatile memory device in response to entering the exclusive mode through the host controller, and then exclusively uses the volatile memory device for the performing of the merge operation on the nonvolatile memory device during the entry period of the exclusive mode.

9. The memory system of claim 2, wherein the memory controller converts a state of data updated to the nonvolatile memory device among data stored in the volatile memory device into a discard state in response to entering the exclusive mode through the host controller, and exclusively uses the volatile memory device for the performing of the merge operation on the nonvolatile memory device during the entry period of the exclusive mode.

10. The memory system of claim 1, wherein the merge operation comprises an operation of merging valid data included in at least two victim memory blocks among the memory blocks, and transferring the merged valid data to a target memory block.

11. A method of operating a memory system comprising a nonvolatile memory device including a plurality of memory blocks, each of which includes a plurality of pages, and a volatile memory device configured to temporarily store data to be transmitted between a host and the nonvolatile memory device, the method comprising:
entering an exclusive mode in response to at least one of a request of the host, a result of checking a state of the nonvolatile memory device and a merge operation performed on the nonvolatile memory device;
exclusively using the volatile memory device to perform the merge operation during an entry period of the exclusive mode; and
exiting the exclusive mode in response to completing the performing of the merge operation.

12. The method of claim 11,
wherein the memory system further comprises a host controller configured to process an operation between the memory system and the host, and a memory controller coupled with the host controller and configured to process an operation between the memory system and the nonvolatile memory device, and
wherein the exiting comprises generating, by the memory controller, an exclusive mode exit request after the performing of the merge operation is competed, and transmitting the exclusive mode exit request to the host controller.

13. The method of claim 12, wherein the entering comprises:
a first entering operation of entering, by the host controller, the exclusive mode in response to an exclusive mode entry request transmitted from the memory controller to the host controller;
a second entering operation of entering, by the host controller, the exclusive mode in response to a request for the performing of the merge operation, the request being transmitted from the host to the host controller, and requesting the performing of the merge operation to the memory controller from the host controller; and
notifying, by the host controller, the host that a state of the memory system is converted into a busy state in response to entering the exclusive through the first and second entering operations.

14. The method of claim 13, wherein the entering further comprises checking a proportion of free memory blocks among the memory blocks through the memory controller, generating by the memory controller the exclusive mode entry request when the proportion of the free memory blocks is equal to or less than a predetermined value as a result of the checking, and transmitting the exclusive mode entry request to the host controller.

15. The method of claim 13, wherein the entering further comprises checking, when the merge operation is performed through the memory controller, a total number of valid pages included in victim memory blocks among the memory blocks, generating by the memory controller the exclusive mode entry request when the total number of valid pages is equal to or more than a predetermined value as a result of the checking, and transmitting the exclusive mode entry request to the host controller.

16. The method of claim 13, wherein the entering further comprises generating by the memory controller the exclusive mode entry request each time the merge operation is performed through the memory controller, and transmitting the exclusive mode entry request to the host controller.

17. The method of claim 12, wherein the exiting further comprises:

an operation of exiting, by the host controller, the exclusive mode in response to the exclusive mode exit request transmitted from the memory controller to the host controller; and an operation of notifying, by the host controller, the host that a state of the memory system is converted into a ready state in response to exiting the exclusive mode through the operation of exiting.

18. The method of claim 12, further comprising flushing, by the memory controller, data stored in the volatile memory device to the nonvolatile memory device in response to entering the exclusive mode through the entering, and then performing the exclusively using.

19. The method of claim 12, further comprising converting, by the memory controller, a state of data updated to the nonvolatile memory device among data stored in the volatile memory device into a discard state in response to entering the exclusive mode through the entering, and then performing the exclusively using.

20. The method of claim 11, wherein the merge operation comprises an operation of merging valid data included in at least two victim memory blocks among the memory blocks, and transferring the merged valid data to a target memory block.

* * * * *